United States Patent [19]
Stein et al.

[11] Patent Number: 6,052,124
[45] Date of Patent: Apr. 18, 2000

[54] SYSTEM AND METHOD FOR DIRECTLY ESTIMATING THREE-DIMENSIONAL STRUCTURE OF OBJECTS IN A SCENE AND CAMERA MOTION FROM THREE TWO-DIMENSIONAL VIEWS OF THE SCENE

[75] Inventors: Gideon P. Stein, Somerville, Mass.; Amnon Shashua, Mevasseret Zion, Israel

[73] Assignee: Yissum Research Development Company, Jerusalem, Israel

[21] Appl. No.: 09/016,701

[22] Filed: Jan. 30, 1998

Related U.S. Application Data

[60] Provisional application No. 60/036,848, Feb. 3, 1997.

[51] Int. Cl.[7] .................................................. G06K 9/00
[52] U.S. Cl. .................... 345/419; 382/107; 382/154; 382/236; 382/285
[58] Field of Search ............................ 345/419; 382/107, 382/154, 236, 285

[56] References Cited

U.S. PATENT DOCUMENTS

5,109,425  4/1992  Lawton ........................................ 382/1

*Primary Examiner*—Mark R. Powell
*Assistant Examiner*—Lance W. Sealey
*Attorney, Agent, or Firm*—Richard A. Jordan

[57] ABSTRACT

A scene reconstruction system generates a reconstruction of at least one feature of at least one three-dimensional object in a scene from three two-dimensional views as recorded from a plurality of diverse locations. The scene reconstruction system includes a motion parameter generator, a dense depth map generator, and a scene reconstructor. The motion parameter generator generates in response to gradients in image intensity values at respective points in a first view and temporal derivatives of image intensity values as between second and third views and the first view values for motion parameters representing as between a first view recordation location for the first view, and view recordation locations for the second and third views. The dense depth map generator generates a dense depth map in response to the values for the motion parameters, gradients in image intensity values at respective points in a first view and temporal derivatives of image intensity values as between second and third views and the first view, the dense depth map representing for each point in the first view the depth of a corresponding point in the scene. The scene reconstructor uses the dense depth map in generating a reconstruction of the at least one feature.

18 Claims, 3 Drawing Sheets

100. IMAGE ANALYZER MODULE 14 RECEIVES THE IMAGE INFORMATION FOR THE RESPECTIVE VIEWS

↓

101. IMAGE ANALYZER MODULE 14 GENERATES AN N-BY-FIFTEEN MATRIX "A" BASED ON THE SYSTEM OF EQUATIONS DEFINED BY EQUATION (12), WHERE THE COMPONENTS OF A ARE THE COEFFICIENTS OF THE RESPECTIVE INTERMEDIATE PARAMETERS

↓

102. IMAGE ANALYZER MODULE 14 GENERATES THE MATRIX PRODUCT "ATA"

↓

103. IMAGE ANALYZER MODULE 14 DETERMINES THE EIGENVECTOR THAT CORRESPONDS TO THE SECOND SMALLEST EIGENVALUE THEREOF, THE FIRST SIX ELEMENTS OF WHICH PROVIDE THE COMPONENTS OF THE TRANSLATION PARAMETERS

↓

104. IMAGE ANALYZER MODULE 14 ORGANIZES THE LAST NINE ELEMENTS OF THE EIGENVECTOR DETERMINED IN STEP 103 INTO THE THREE-BY-THREE MATRIX AND CONSTRUCTS A RANK-2 MATRIX B THEREFROM AND FROM IDENTITY MATRIX AS DESCRIBED IN CONNECTION WITH EQUATION (24)

SYSTEM AND METHOD FOR DIRECTLY ESTIMATING THREE-DIMENSIONAL STRUCTURE OF OBJECTS IN A SCENE AND CAMERA MOTION FROM THREE TWO-DIMENSIONAL VIEWS OF THE SCENE

INCORPORATION BY REFERENCE

This application claims benefit of provisional application 60/036,848 filed Feb. 3, 1997.

"Direct methods for estimation of structure and motion from three views," a paper by Gideon P. Stein and Amnon Shashua, attached hereto and incorporated herein by reference.

"Direct Estimation Of Motion And Extended Scene Structure From A Moving Stereo Rig," a paper by Gideon P. Stein, attached hereto and incorporated herein by reference.

FIELD OF THE INVENTION

The invention relates generally to the fields of photogrammetry and image processing, and more particularly to systems and methods for reconstructing and regenerating elements and features of three-dimensional objects in a scene from a plurality of two-dimensional images of the scene.

BACKGROUND OF THE INVENTION

Reconstruction of three-dimensional objects in a scene from multiple two-dimensional images of the scene has been the subject of research since the late 19th century. Such reconstruction may be useful in a number of areas, including obtaining information about physical (three-dimensional) characteristics of objects in the scene, such as determination of the actual three-dimensional shapes and volumes of the objects. Reconstruction has also recently become particularly important in, for example, computer vision and robotics. The geometric relation between three-dimensional objects and the images created by a simple image recorder such as a pinhole camera (that is, a camera without a lens) is a source of information to facilitate a three-dimensional reconstruction. Current practical commercial systems for object reconstruction generally rely on reconstruction from aerial photographs or from satellite images. In both cases, cameras are used which record images from two locations, whose positions relative to a scene are precisely determinable. In reconstruction from aerial photographs, two cameras are mounted with precise spacing and orientation on a common airborne platform, which ensures that the geometries of the cameras relative to each other are fixed in a known condition. With satellites, the positions and orientations of the satellites can be determined with great accuracy, thereby providing the required geometrical information required for reconstruction with corresponding precision. In any case, reconstruction of the desired objects shown in the images can be performed from two-dimensional photographic or video images taken from such an arrangement.

Generally, reconstruction methods are non-linear and they generally do not behave well in the presence of errors in measurement of the various camera calibration parameters and in the images from which the objects are to be reconstructed. Conventional reconstruction methods rely on the successful decoupling of two sets of parameters known as intrinsic and extrinsic parameters. The extrinsic parameters are related to the external geometry or arrangement of the cameras, including the rotation and translation between the coordinate frame of one camera in relation to the coordinate frame of the second camera. The intrinsic parameters associated with each camera is related to the camera's internal geometry in a manner that describes a transformation between a virtual camera coordinate system and the true relationship between the camera's image plane and its center of projection (COP). The intrinsic parameters can be represented by the image's aspect ratio, the skew and the location of the principal point, that is, the location of the intersection of the camera's optical axis and the image plane. (Note that the camera's focal length is related to the identified intrinsic parameters, in particular the aspect ratio, and thus it need not be considered as a parameter.)

These intrinsic and extrinsic parameters are coupled together and it is possible to recover the Euclidean three-dimensional structure of the scene depicted in two views only if these two sets of parameters can be decoupled. The precise manner in which the intrinsic and extrinsic parameters are coupled together is as follows. If the intrinsic parameters for the cameras are used to form respective three-by-three matrices M and M', and R and "t" represent the rotational and translational external parameters, then for points $p=(x,y,1)^T$ and $p'=(x',y',1)^T$ ("T" represents the matrix transpose operation) representing the projection in the two images of a single point P in the scene, $$z'p' = zM'RM^{-1}p - M't \qquad (1)$$

where z and z' represent respective depth values for point P relative to the two camera locations.

There are several general methods for reconstruction. In one set of methods, the values of the various parameters in equation (1) are determined. In one such method the values of the internal parameters are determined by a separate and independent "internal camera calibration" procedure that relies on images of specialized patterns. In a second such method, more than two views of a scene are recorded and processed and the two sets of parameters are decoupled by assuming that the internal camera parameters are fixed for all views. Processing to determine the values of the parameters proceeds using non-linear methods, such as recursive estimation, non-linear optimization techniques such as Levenberg-Marquardt iterations, and more recently projective geometry tools using the concept of "the absolute conic." One significant problem with the first approach (using a separate internal camera calibration step) is that even small errors in calibration lead to significant errors in reconstruction. The methods for recovering the extrinsic parameters following the internal calibration are known to be extremely sensitive to minor errors in image measurements and require a relatively large field of view in order to behave properly. In the second approach (using more than two views of a scene) the processing techniques are iterative based on an initial approximation, and are quite sensitive to that initial approximation. In addition, the assumption that the internal camera parameters are fixed is not always a good assumption.

Another set of methods does not require determining the values of the various parameters in equation (1). Instead, reconstruction is performed from an examination of various features of the scene which are present in images of the scene that are recorded from a plurality of diverse locations. One such method, described in U.S. Pat. No. 5,598,515, entitled "System And Method For Reconstructing Surface Elements Of Solid Objects In A Three-Dimensional Scene From A Plurality Of Two Dimensional Images Of The Scene," issued Jan. 28, 1997, in the name of Amnon Shashua, describes a system and method for scene reconstruction from two views. In the system and method described in that patent, the epipole for at least one of the images is determined, which can lead to error in the reconstruction. In several other methods, described in, for example, A. Shashua, "Algebraic functions for recognition," IEEE Transactions on Pattern Analysis and Machine Intelligence, Vol. 17, No. 8, pp. 779–789 (1995), and R. Hartley, "Lines and points in three views-a unified approach," Proceedings of the 1994 Image Understanding Workshop, pp. 1009–1016, do not require the direct determination of the epipoles, but those methods require use of three views. All of these methods require that corresponding points and/or lines, that is, points and/or lines in the views which are projections of the same points and/or lines in the scene, be located in all of the three views. In some applications, locating corresponding points and/or lines in the three views can be difficult or impossible.

SUMMARY OF THE INVENTION

The invention provides a new and improved system and method for reconstructing and regenerating elements and features of three-dimensional objects in a scene from a plurality of two-dimensional view of the scene, without requiring location of corresponding points and/or lines in the various views.

In brief summary, a scene reconstruction system generates a reconstruction of at least one feature of at least one three-dimensional object in a scene from three two-dimensional views as recorded from a plurality of diverse locations. The scene reconstruction system includes a motion parameter generator, a dense depth map generator, and a scene reconstructor. The motion parameter generator generates in response to gradients in image intensity values at respective points in a first view and temporal derivatives of image intensity values as between second and third views and the first view values for motion parameters representing as between a first view recordation location for the first view, and view recordation locations for the second and third views. The dense depth map generator generates a dense depth map in response to the values for the motion parameters, gradients in image intensity values at respective points in a first view and temporal derivatives of image intensity values as between second and third views and the first view, the dense depth map representing for each point in the first view the depth of a corresponding point in the scene. The scene reconstructor uses the dense depth map in generating a reconstruction of the at least one feature.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
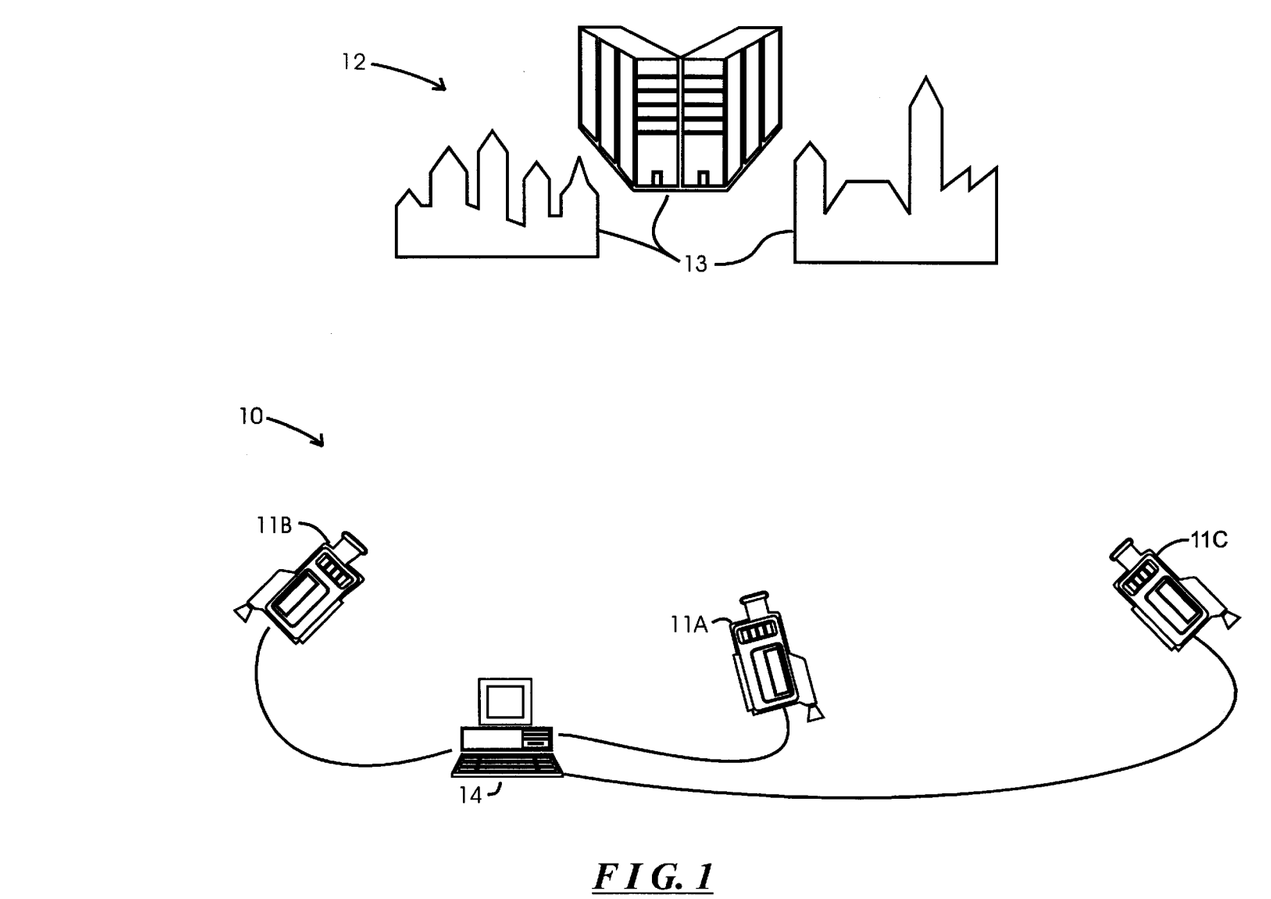
FIG. 1 is a diagram schematically illustrating an arrangement for reconstructing objects in a scene, in accordance with the invention.

FIG. 1 is a diagram schematically illustrating an system 10 for reconstructing, in three dimensional form, surfaces of objects in a scene, based on two-dimensional images of the scene, in accordance with the invention. With reference to FIG. 1, system 10 includes a plurality of image recorders 11A, 11B and 11C (generally identified by reference numeral 11) such as photographic or video cameras, which record two-dimensional images of a scene 12. The scene 12 generally comprises a plurality of three-dimensional objects, represented in FIG. 1 by buildings identified by reference numeral 13. At least some features of the surfaces of the objects in scene 12 are to be reconstructed, in three-dimensional form, from the images recorded by the image recorders 11. The image recorders 11 are positioned to record images, or "views," $\Psi_0$, $\Psi_1$ and $\Psi_2$ of the scene 12 from three diverse positions and angles; that is, for objects 13 whose three-dimensional surfaces are to be reconstructed in three-dimensional form, all of the image recorders 11 record the portions of the surfaces to be reconstructed. The system 10 further includes an image analyzer module 14 which receives the views from the image recorders 11 and analyzes them to actually perform the operations described below in connection with FIG. 2. In accordance with those operations, the image analyzer module 14 can generate information that effectively represents a reconstruction, in three-dimensional form, features of selected objects in the scene 12 which are visible in the three views. The reconstruction can be displayed, on a two-dimensional display such as a video display terminal. Alternatively or in addition, the reconstruction can be used for a number of other purposes, which will be apparent to those skilled in the art.

Figure 2:
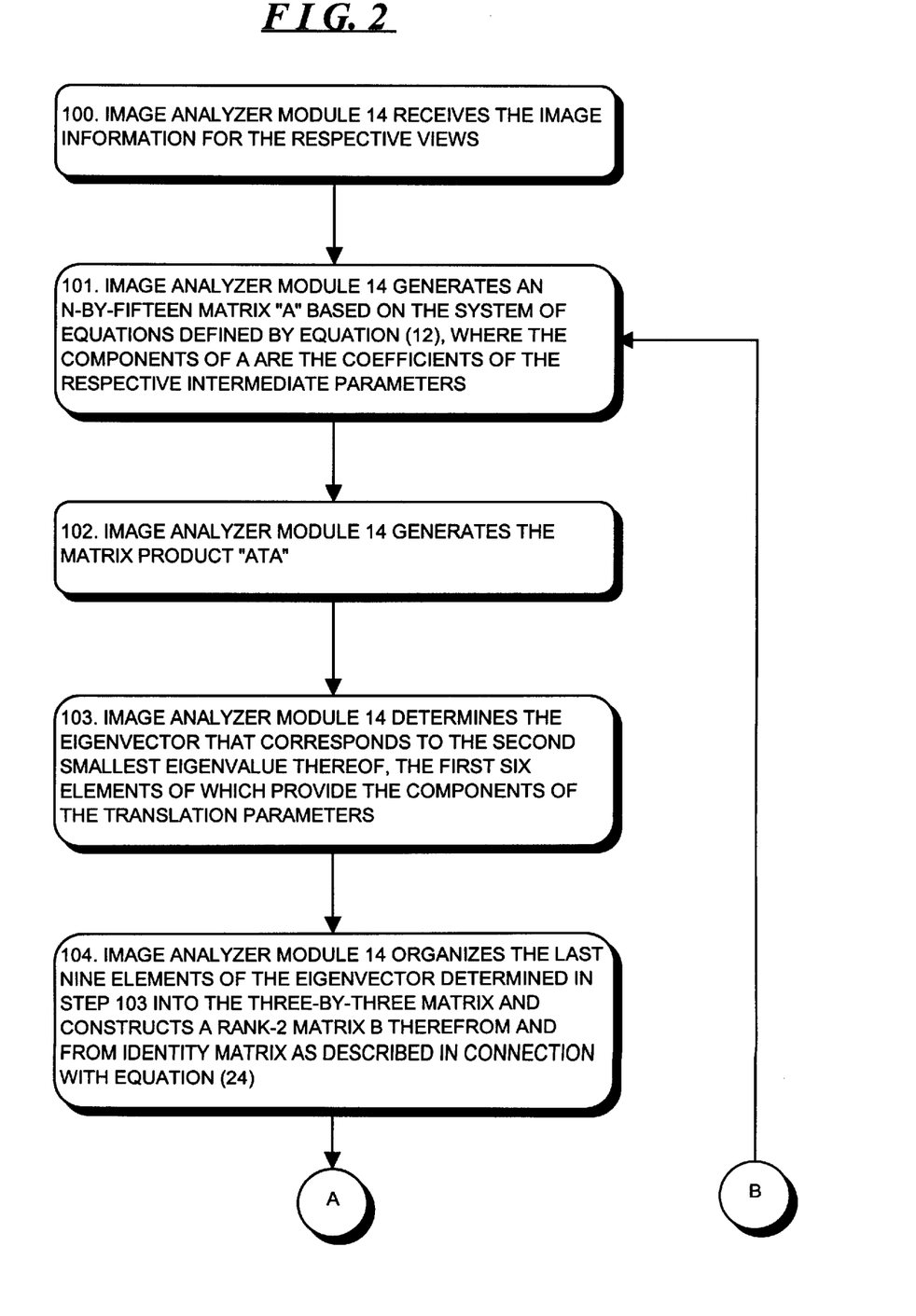
FIG. 2 is a flow diagram depicting operations performed by the image analyzer module depicted in FIG. 1 in reconstructing and regenerating elements and features of three-dimensional objects in a scene from a plurality of two-dimensional view of the scene, without requiring location of corresponding points and/or lines in the various views.
Figure 2A:
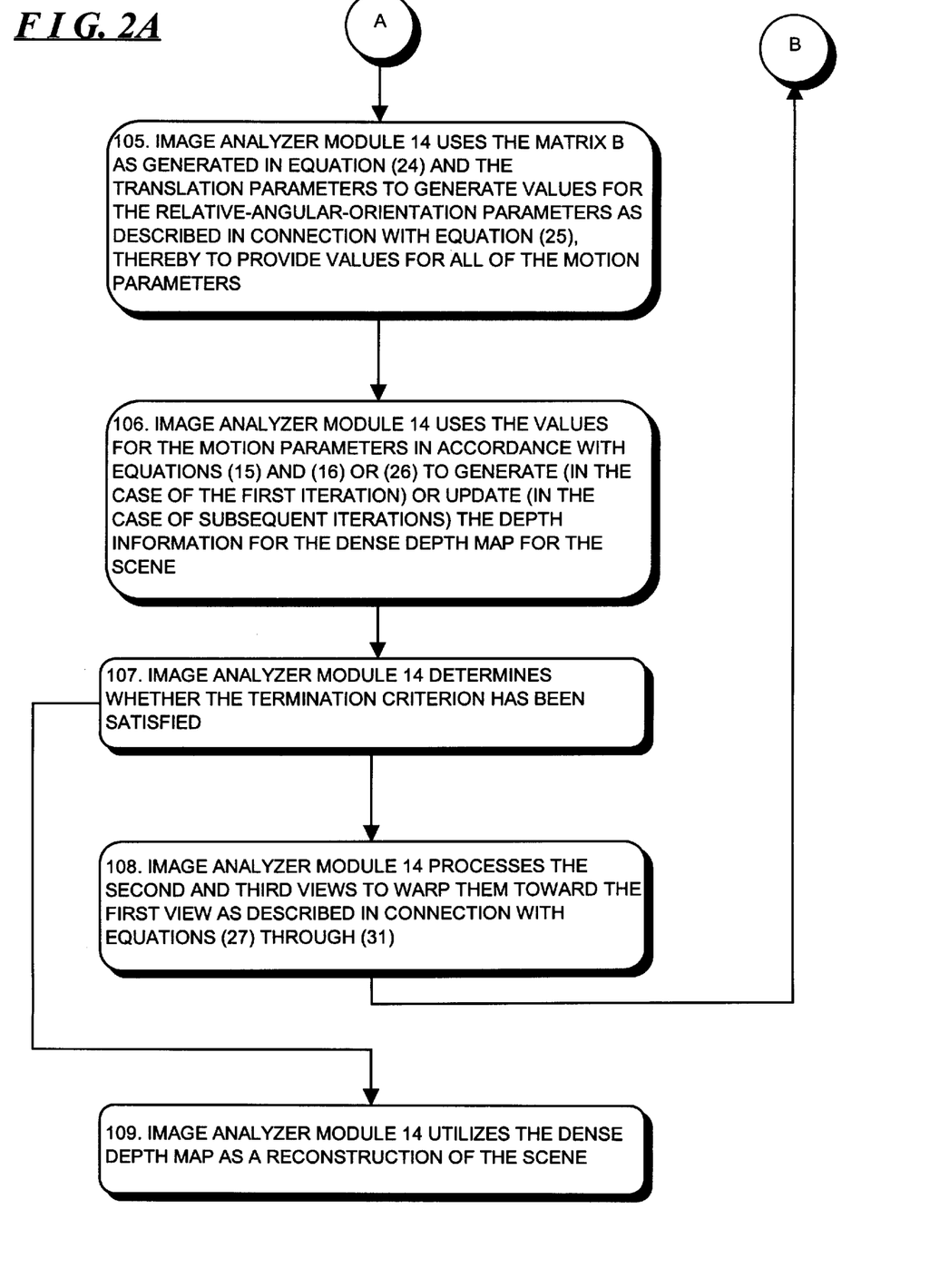

The specific operations performed by the image analyzer module 14 will be described below in connection with FIG. 2. Generally, and by way of background, if P is a point in space in the scene 12 with projection p into the view $\Psi_0$ generated by image recorder 11A, projection p' into the view $\Psi_1$ generated by image recorder 11B and projection p" into the view $\Psi_2$ generated by image recorder 11C, if $p = [I; 0]P$, then $p' \cong AP$ and $p'' \cong BP$, where "$I$" represents the identity matrix $I = \begin{pmatrix} 1 & 0 & 0 \\ 0 & 1 & 0 \\ 0 & 0 & 1 \end{pmatrix}$, "A" and "B" each represent a three row by four column "camera" matrix, and "$\cong$" represents equality up to some unknown scale factor. For each of the camera matrices A and B, the left three row-by-three column portion of the respective matrix represents a two-dimensional projective transformation of the image plane for the respective view at infinity. The fourth (that is, the rightmost) column of the respective column matrix A and B represents the coordinates of the epipole in the respective image plane; that is, for camera matrix A, the fourth column represents the coordinates of the projection of the center of projection of the image recorder 11A on the image plane of image recorder 11B, and, for camera matrix B, the fourth column represents the coordinates of the projection of the center of projection of the image recorder 11A on the image plane of image recorder 11C.

Three views, such as views $\Psi_0$, $\Psi_1$ and $\Psi_2$ generated by image recorders 11, are known to produce three trilinear forms whose coefficients are arranged in a three-dimensional (three-by-three-by-three) tensor representing a bilinear function of the camera matrices A and B as follows:

$$\alpha_i^{jk} = t'^j b_i^k - t''^k a_i^j \qquad (2)$$

where "$\alpha_i^{jk}$" represents the components of the tensor, "$a_i^j$" and "$b_i^k$" represent the components of the left three-by-three minor portion of the camera matrices A and B, respectively, and "$t'^j$" and "$t''^k$" represent the fourth columns of the camera matrices A and B, respectively, that is, camera matrix $A=[a_i^j;t'^j]$ and camera matrix $B=[b_i^k;t''^k]$. The relationship between the tensor and the views is expressed in the following:

$$p^i s_j''^u r_k^p \alpha_i^{jk} = 0 \qquad (3),$$

where "$p^i$" represents a point in the view $\Psi_0$ recorded by image recorder 11A, "$s_j''^u$" represents any two lines $s_j^1$ and $s_j^2$ through the corresponding point $p''^i$ in the view $\Psi_1$ and $\Psi_2$ recorded by image recorder 11B, and "$r_k^p$" represents any two lines $r_k^1$ and $r_k^2$ through the corresponding point $p''^i$ in the view $\Psi_2$ recorded by image recorder 11C. As described in, for example, A. Shashua, "Algebraic functions for recognition," IEEE Transactions on Pattern Analysis and Machine Intelligence, Vol. 17, No. 8, pp. 779–789 (1995), incorporated herein by reference, the components $\alpha_i^{jk}$ of the trilinear tensor can be determined using seven corresponding points in the three views. (Points p, p' and p" in the respective views are "corresponding" points if they are points corresponding to projections of the same point P in the scene.) In addition, as described in R. Hartley, "Lines and points in three views-a unified approach," Proceedings of the 1994 Image Understanding Workshop, pp. 1009–1016, the components $\alpha_i^{jk}$ of the trilinear tensor can be determined using a combination of points and lines, with fewer than seven points being required, in the three views.

A problem can arise in that, under some circumstances, it may be difficult to identify the required number of points and/or lines in the three views to facilitate generation of the tensor. In accordance with the invention, the image analyzer module 14 makes use of gradients in luminance or brightness at various points in the first view $\Psi_0$, and differences in brightness as between points with corresponding coordinates as between the other two views $\Psi_1$ and $\Psi_2$ and the first view $\Psi_0$. The image analyzer module 14 will not need to find corresponding points and/or lines in the three views, which can simplify the reconstruction of the scene. If point p in the view $\Psi_0$ recorded by image recorder 11A (hereinafter also referred to as the "first view") has coordinates $(x_p, y_p, 1)$ in the image plane of the first view $\Psi_0$, the corresponding point p' in the view $\Psi_1$ recorded by image recorder 11B (hereinafter also referred to as the "second view") has coordinates $(x'_p, y'_p, 1)$ in the image plane of the second view $\Psi_1$, and the corresponding point p" in the view $\Psi_2$ recorded by image recorder 11C (hereinafter also referred to as the "third view") has coordinates $(x''_p, y''_p, 1)$ in the image plane of the third view $\Psi_2$. Thus, coordinates of points in the image plane of the first view $\Psi_0$ are given by (x,y, 1), coordinates of points in the image plane of the second view $\Psi_1$ are given by (x',y',1) and coordinates of points in the image plane of the third view $\Psi_2$ are given by (x",y",1). In that case, a straight line s' in the second view $\Psi_1$ coincident with point p' will have the form $ax'+by'+\lambda=0$, where a, b and $\lambda$ are constants. Since a straight line in the second view will correspond to a straight line in the first view, substituting x'=x+u and y'=y+v, where "u,v" represents a displacement vector, the equation of the line s' would be represented as au'+bv'+c=0, where $c=\lambda+ax+by$. Therefore, line s' coincident with point p' can be described as the vector (a,b,c−ax−by). The scalars a, b, and c can be substituted by $I_x$, $I_y$ and $I'_t$, respectively, in the constant brightness equation, $$u'I_x + v'I_y + I'_t = 0 \qquad (4).$$

In equation (4), $I_x$ and $I_y$ represent the "x" and "y" components of the gradient in the image intensity values at point (x,y) in the first view and $I'_t$ represents the discrete temporal derivative at point (x,y), that is $I_1(x,y) - I_0(x,y)$, where $I_0(x,y)$ represents the image intensity value of point (x,y) in the first view $\Psi_0$ and $I_1(x,y)$ represents the image intensity value of the point with the same coordinate (x,y) in the second view $\Psi_1$. Thus, if the differences between the positions and angular orientations of the image recorders 11A and 11B are small, that is, under a "small motion" assumption, the line $$s' = \begin{pmatrix} I_x \\ I_y \\ I'_t - xI_x - yI_y \end{pmatrix} \qquad (5)$$

is coincident with the point p' in the second view $\Psi_1$. Since, as noted above, $I_x$ and $I_y$ form the components of the gradient of the image intensity value components at point p in the first view, the orientation of the line s' is normal to the tangent of the iso-brightness contour at point p in the first view. Similarly, a line s" coincident with the corresponding point p" in the third view $\Psi_2$, and normal to the tangent of the iso-brightness contour at point p in the first view, has the form $$s'' = \begin{pmatrix} I_x \\ I_y \\ I''_t - xI_x - yI_y \end{pmatrix} \qquad (6)$$

where $I''_t$ is the temporal derivative between the first and third views. The tensor brightness constraint is, from equation (3), $$s''_k s'_j p^i \alpha_i^{jk} = 0 \qquad (7).$$

Each point $p^i$ on the view $\Psi_0$ for which $s''_k$ and $s'_j$ can be generated from the gradients of the image intensity values provides one equation (7). Since there are twenty-seven components $\alpha_i^{jk}$ for the tensor, twenty-seven such points $p^i$ and associated lines $s''_k$ and $s'_j$ would be required to generate the tensor.

If the angular orientations $\omega'$ and $\omega''$ of image recorders 11B and 11C, respectively, relative to image recorder 11A, are small, then the camera matrices A and B correspond to $A=[I+[\omega']_x;t']$ and $B=[I+[\omega'']_x;t'']$, where $\omega'$ and $\omega''$ correspond to the angular velocity vectors and $[\omega']_x$ and $[\omega'']_x$ correspond to the skew-symmetric matrix of vector products. Under the small-relative angular-orientation assumption, and if the image recorders 11 are internally calibrated (that is, if the camera parameters such as the focal length are known), the tensor brightness constraint (equation (7)) reduces to $$I''_t s'^T t' - I'_t s''^T t'' + s'^T [t' \omega''^T] v'' - s''^T [t'' \omega'^T] v' = 0 \qquad (8).$$

where $$v' = p \times s' = \begin{pmatrix} -I_x + y(I'_t - xI_x - yI_y) \\ I_x - x(I'_t - xI_x - yI_y) \\ xI_y - yI_x \end{pmatrix} \quad (9)$$

and $$v' = p \times s'' = \begin{pmatrix} -I_y + y(I''_t - xI_x - yI_y) \\ I_x - x(I''_t - xI_x - yI_y) \\ xI_y - yI_x \end{pmatrix}, \quad (10)$$

and superscript-"T" represents the matrix transpose operation. Under the small-relative-angular-orientation assumption (equations (8) through (10) above), there are twenty-four parameters to be solved for, twenty of which are linearly independent. However, equation (8) is not sufficiently constrained to permit a unique solution to be determined without a significant amount of effort and added complexity.

If it is further assumed that the translations t' and t" between the first view, on the one hand, and the second and third views $\Psi_1$ and $\Psi_2$, respectively, on the other hand, are also small, a unique solution can readily be determined which also does not require finding corresponding points in the three views. In that case, then if $$u' = \frac{1}{z}(t'_1 - xt'_3) - \omega'_3 y + \omega'_2(1 + x^2) - \omega'_1 xy$$
$$v' = \frac{1}{z}(t'_2 - yt'_3) + \omega'_3 x - \omega'_1(1 + y^2) + \omega'_2 xy \quad (11)$$

and substituting equations (11) into equation (4), a fifteen-intermediate-parameter model-based constant brightness constraint is provided defined by $$I''_t S^T t' - I'_t S^T t'' + S^T[t'\omega''^T - t''\omega'^T]V = 0 \quad (12),$$

where $$S = \begin{pmatrix} I_x \\ I_y \\ -xI_x - yI_y \end{pmatrix} \quad (13)$$

and $$V = \begin{pmatrix} -I_y - y(xI_x + yI_y) \\ I_x + x(xI_x + yI_y) \\ xI_y - yI_x \end{pmatrix}, \quad (14)$$

the fifteen intermediate parameters comprising
  (i) six translation parameters, forming respective one-by-three vectors, comprising the three spatial components each of the translation parameters t' and t", and
  (ii) nine outer product terms $[t'\omega''^T - t''\omega'^T]$, which form a three-by-three matrix which are a function of the translation parameters t' and t" and the relative angular orientation parameters $\Psi'$ and $\omega''$.

Methodologies used in one embodiment for generating values for the translation parameters t' and t" and the relative angular orientation parameters $\omega'$ and $\omega''$ using equations (12) through (14) will be described below. After the values for the parameters t', t", $\omega'$ and $\omega''$ have been generated, a dense depth map for points P in the scene is generated, using $$\frac{1}{z} S^T t' + V^T \omega' + I'_t = 0 \quad (15)$$

and $$\frac{1}{z} S^T t'' + V^T \omega'' + I''_t = 0 \quad (16)$$

where "z" represents a depth value at each point p in the first view, which depth value is associated with the distance to the point P in the scene for which p is the projection in the first view. (Equations (15) and (16) are obtained by substituting equations (11) into equation (4) and rearranging. By combining equations (15) and (16) to eliminate the 1/z factor, equation (12) is generated.) Thus, for each point p in the first view, the coordinates of the respective point P in the scene are related to the coordinates of the projection p in the first view and the depth value "z" which can be determined in accordance with equations (15) and (16).

As noted above, the image analyzer module 14 can generate the dense depth map, in accordance with equations (15) and (16), after the values for the translation parameters t' and t" and the relative angular orientation parameters $\omega'$ and $\omega''$ have been generated in accordance with equation (12). It will be appreciated from equation (12) that, if the angular orientation of both image recorders 11B and 11C relative to image recorder 11A correspond to zero, the values of both $\omega'$ and $\omega'$ will correspond "zero," equation (12) reduces to $$I''_t S^T t' - I'_t S^T t'' = 0 \quad (17)$$

which is a linear equation in six unknowns, namely, the three spatial components each for the translation variables t' and t". Equation (17) can be expressed in matrix as $$At = 0 \quad (18),$$

where $$t = (t'_x, t'_y, t'_z, t''_x, t''_y, t''_z) \quad (19)$$

and A is an N-by-six matrix (where "N" corresponds to the number of points in the first view $\omega_0$ at which measurements are taken) in which the i-th row, which is associated with the i-th point, corresponds to $$(I''_t S_{i1}, I''_t S_{i2}, I''_t S_{i3}, I'_t S_{i1}, I'_t S_{i2}, I'_t S_{i3}) \quad (20),$$

where "$S_{i1}$," "$S_{i2}$" and "$S_{i3}$" represent the three components of the vector S. Generally, each point in the view $\Psi_0$ can be used, and so "N" will usually be much larger than six, the number of columns in the matrix A. The image analyzer module 14 can solve equation (18) using conventional least-squares methodologies, in which "$t^T A^T A t$" ("T" representing the matrix transpose operation) is minimized, with the constraint that $t \neq 0$.

In the more general case, if it is not assumed that the angular orientation of both image recorders 11B and 11C relative to image recorder 11A correspond to zero, the values of at least one or both of $\omega'$ and $\omega''$ will not correspond to zero. In that case, since each outer product term $[t'\omega''^T - t''\omega'^T]$ is a function of all of the motion parameters t', t", $\omega'$ and $\omega''$, unlike the zero-relative-angular-orientation model described above, equation (12) is not a linear function of the parameters t', t", $\omega'$ and $\omega''$, but instead is a bilinear function thereof. Since equation (12) has the fifteen intermediate parameter values whose values are to be determined, a system of at least fifteen equations using equation (12) are necessary for which values $I'_p$, $I''_p$, S and V are provided. Essentially, one point in the first view $\Psi_0$ can provide the required values for $I'_p$, $I''_p$, S and V for each equation in the system, and so at least fifteen points will be needed to obtain the parameter values. If N points (N≧15) in the first view $\Psi_0$ are used, equation (12) provides an N-by-fifteen system of equations, "fifteen" corresponding to the number of intermediate parameters and "N" corresponding to the number of points p in the first view $\Psi_0$ for which equations are generated for the system of equations. Generally, each point in the view $\Psi_0$ can be used, and so "N" will usually be much larger than fifteen, the number of columns in the matrix A.

The image analyzer module 14 generates a solution to the system of equations as follows. First, an N-by-fifteen matrix A is generated using equation (12) to define the values for the coefficients of the intermediate parameters set forth in equation (12). Generally, although the intermediate parameters are not linearly independent, since each of the nine outer product terms $[t'\omega''^T - t''\omega'^T]$ is a function of all of the actual parameters t', t", ω' and ω", the image analyzer module 14 initially generally processes the matrix A as if the intermediate parameters were linearly independent. After obtaining the values for the intermediate parameters, the image analyzer module 14 will generate the values for ω' and ω" using the values generated for $[t'\omega''^T - \omega'^T]$ using the values generated for the intermediate (as well as final) parameters t' and t".

More specifically, from equation (12) it is clear that the correct solution vector for equation 12, identified here vector b, is in the null space of an N-by-fifteen matrix A, that is, Ab=0, where "0" represents a fifteen-component vector, with each component having the value "zero." Generally, the vector $$c_0 = (0,0,0,0,0,0,1,0,0,0,1,0,0,0,1)^T \quad (21)$$

is in the null space of matrix A (that is, vector $c_0$ is a solution for equation Ab=0), and the null space of matrix A has a rank "r" which can be taken to be equal to "two." (Specifically, the rank "r" of matrix A may be greater than or equal to two and less than or equal to thirteen, that is, 2≦r≦13, but in one embodiment the image analyzer module 14 operates in accordance with the constraint that the value of rank "r" is equal to "two.") If a vector $b_0$ is also in the null space of matrix A, such that the cross product of $c_0$ and $b_0$ is not equal to zero, then the two vectors $c_0$ and $b_0$ span the null space of matrix A and the desired solution vector b is a linear combination thereof, that is, $$b = b_0 + \alpha c_0 \quad (22),$$

where "α" is a numerical constant. The image analyzer module 14 can determine the appropriate value of the constant α by enforcing the constraint that the matrix $[t'\omega''^T - t''\omega'^T]$ have a rank equal to two. Since, from equation (21), the first six elements of vector $c_0$ are all zero, the value of α will not affect the first six elements of the vector b (equation (22), and so, if the last nine elements of vectors b, $b_0$ and $c_0$ are arranged in respective three-by-three matrices (for example, if the last nine elements of $c_0$, "1,0,0,0,1,0,0, 0,1" are arranged in the three-by-three matrix $$\begin{matrix} 1 & 0 & 0 \\ 0 & 1 & 0, \\ 0 & 0 & 1 \end{matrix}$$

which, in turn, corresponds to the identity matrix, then the value of a is determined from $$\text{Rank}(B_0 - \alpha C_0) = 2 \quad (23).$$

Further, since, as noted above, the matrix $C_0$ is the identity matrix, the value of α is one of the eigenvalues of the matrix $B_0$. In one embodiment, the image analyzer module 14 generates for each of the eigenvalues $\alpha_i$ (index "i" having the values 1, 2 and 3), a candidate matrix $b_i$ in accordance with equation (22), that is, $b_i = b_0 + \alpha_i c_0$, for each i=1, 2, 3. For each matrix $b_i$, and using the previously-determined values for the translation parameters t' and t", the image analyzer module 14 generates values for the relative-angular-orientation parameters ω' and ω' in accordance with $[t'\omega''^T - t''\omega'^T]$. After the relative-angular-orientation parameters ω' and ω" have been generated, the image analyzer module generates a sum-squared error using the relative-angular-orientation parameters and the translation parameters and equation (12), and selects as the value for the appropriate α the one of the eigenvalues $\alpha_i$ which provided the smallest sum-squared error.

Thus, to generate the values for the motion parameters t', t", ω' and ω", the image analyzer module 14 performs the following operations. First, the image analyzer module 14 generates the N-by-fifteen matrix A based on the system of equations defined by equation 12, where the components of A are the coefficients of the respective intermediate parameters. Thereafter, the image analyzer module generates the matrix product $A^T A$ and determines the eigenvector that corresponds to the second smallest eigenvalue thereof, which eigenvector, in turn, corresponds to $b_0$. The first six elements of the vector $b_0$ provide the components of the translation parameters t' and t". The image analyzer module 14 then organizes the last nine elements of the vector $b_0$ into the three-by-three matrix $B_0$ and constructs the rank-2 matrix B from $B_0$ and the identity matrix as $$B = B_0 - \alpha I \quad (24),$$

in the process selecting the appropriate value for α as described above. Thereafter, the image analyzer module 14 uses the matrix B as generated in equation (24) and t' and t" which are generated as described above to generate values for ω' and ω" as $$[t'\omega'''^T - t''\omega'^T] = B \quad (25).$$

Following the operation described above in connection with equation 25, it will be appreciated that the image analyzer module 14 will have generated the values for all of the required motion parameters, including the translation parameters t' and t" and the relative-angular-orientation parameters ω' and ω", defining the relative translational positions and angular orientations between the second and third views $\Psi_1$ and $\Psi_2$, as recorded by the image recorders 11B and 11C and the first view, as recorded by image recorder 11A. It will be appreciated that, in generating the values for the motion parameters, the image analyzer module 14 need not find corresponding points and/or lines in the three views, that is, points and/or lines in the three views that are projections of the same respective points or lines in the scene being reconstructed.

After generating the values for the motion parameters t', t", ω' and ω", the image analyzer module 14 can generate the dense depth map, which, as described above, defines a reconstruction of the scene 12, in accordance with equations (15) and (16). In one particular embodiment, in order to combine the information related to the second and third views, $\Psi_1$ and $\Psi_2$, to interpolate over areas in which the gradients are small, the image analyzer module 14 makes use of a local weighted regression arrangement, in which the image analyzer module 14 generates the depth value "Z" associated with a point (x,y) in the first view in accordance with $$\operatorname*{minarg}_{\frac{1}{z}} \sum_{x,y \in R} \sum_{j} \beta(x,y) |S^T t^j|^p \left( \frac{1}{z} S^T t^j + V^T \omega^j + I_t^j \right)^2, \quad (26)$$

where (i) "min" is a "minimum" function, (ii) "β(x,y)" is a selected windowing function for a region "R" around the point (x,y) in the first view for which the depth value "z" is being generated, (iii) "j" identifies the respective second or third view, and (iv) the term "$|S^T t^j|^p$" is provided to reduce or minimize contributions from points at which the image intensity gradient is very small, which may be highly affected by noise (where "p" is a selected exponent value; in one embodiment, the value selected for the exponent "p" is "one").

It will be appreciated that the remainder of equation (26) is associated with the expressions in equations (15) and (16). Preferably, the windowing function β(x,y) is selected to increase the weight given to points in the region that are relatively close to the respective point (x,y), and diminish the weight given to points relatively distant therefrom, and will generally be expected to take the approximate form of a Gaussian, or bell-shaped, function.

The constant brightness constraint provides a linearized form of a "sum square difference" ("SSD") criteria, and the linear solution described above to generate values for the translation and relative-angular-orientation parameters t', t", and ω" can be considered a single iteration of Newton's general method. In one embodiment, the image analyzer module 14 refines the values for the parameters and the dense depth map through a plurality of iterations. In each iteration, the image analyzer module 14 generates values for the parameters translation and relative-angular-orientation parameters and a dense depth map, and in addition generates two intermediate views $\hat{\Psi}_1$ and $\hat{\Psi}_2$, which represent views $\Psi_1$ and $\Psi_2$ warped towards the view $\Psi_0$ as recorded by image recorder 11A. After warping, the intermediate views $\hat{\Psi}_1$ and $\hat{\Psi}_2$ satisfy the brightness constant constraint $$I_x du' + I_y dv' + \hat{I}'_t = 0$$

$$I_x du'' + I_y dv'' + \hat{I}''_t = 0 \quad (27)$$

(compare equation (4)), where the temporal derivatives at each point correspond to $$\hat{I}'_t = \hat{\Psi}_1 - \Psi_0$$

$$\hat{I}''_t = \hat{\Psi}_2 - \Psi_0 \quad (28)$$

and $du^j$ and $dv^j$ are the differences between the computed image motions and the real image motions $$du^j = u^j - \hat{u}^j$$

$$dv^j = v^j - \hat{v}^j \quad (29),$$

which differences are as yet unknown. Letting $\alpha^j = I_x \hat{u}^j + I_y \hat{v}^j$ (which corresponds to $\alpha^j = \hat{K} S^T t^j + V^T \omega^j$, where $\hat{K} = 1/\hat{z}$), then equations 27 can be re-written as $$I_x u + I_y v + (I'_t - \alpha') = 0$$

$$I_x u + I_y v + (I''_t - \alpha'') = 0 \quad (30).$$

Substituting equation (11) in equation (30) provides $$\frac{1}{z} S^T t' + V^T \omega' + (I'_t - \alpha') = 0 \quad (31)$$

$$\frac{1}{z} S^T t'' + V^T \omega'' + (I''_t - \alpha'') = 0$$

(compare equations (15) and (16)) which can be used to generate the dense depth map in each iteration. It will be appreciated that the image analyzer module 14 can use the methodology described above in connection with equation (26) in connection with generation of depth information for each iteration which can be used to establish (in the case of the first iteration) and update (in the case of the subsequent iterations) the dense depth map for the scene. In the first iteration, $\hat{K}$ (corresponding to $1/\hat{z}$), $\hat{t}^j$ and $\hat{\omega}^j$ all have the value "zero," and so α will also have the value "zero." The image analyzer module 14 can perform a number of iterations until a predetermined termination criterion, such as performance of a predetermined maximum number of iterations, the dense depth maps generated for successive iterations differing by a predetermined maximum difference criteria, and the like, has been satisfied.

With this background, operations performed by the image analyzer module 14 will be described in connection with the flowchart depicted in FIG. 2. With reference to FIG. 2, the image analyzer module 14 will first receive the image information for the respective views $\Psi_0$, $\Psi_1$ and $\Psi_2$ (step 100). Thereafter, the image analyzer module 14, in a first iteration, generates an N-by-fifteen matrix A based on the system of equations defined by equation 12, where the components of A are the coefficients of the respective intermediate parameters (step 101). Thereafter, the image analyzer module generates the matrix product $A^T A$ (step 102) and determines the eigenvector that corresponds to the second smallest eigenvalue thereof, which eigenvector, in turn, corresponds to $b_0$ (step 103). The first six elements of the vector $b_0$ provide the components of the translation parameters t' and t". The image analyzer module 14 then organizes the last nine elements of the vector $b_0$ into the three-by-three matrix $B_0$ and constructs the rank-2 matrix B from $B_0$ and the identity matrix as described above in connection with equation (24) (step 104). Thereafter, the image analyzer module 14 uses the matrix B as generated in equation (24) and t' and t" which are generated as described above to generate values for ω' and ω" as described above in connection with equation (25) (step 105).

At this point, the image analyzer module 14 will have generated the values for all of the required motion parameters, including the translation parameters t' and t" and the relative-angular-orientation parameters ω' and ω", defining the relative translational positions and angular orientations between the second and third views $\Psi_1$ and $\Psi_2$ and the first view $\Psi_0$. After generating the values for the motion parameters t', t", ω' and ω", the image analyzer module 14 generates (in the case of the first iteration) the depth information for the dense depth map for the scene (step 106), which, as described above, defines a reconstruction of the scene 12, in accordance with equations (15) and (16) or (26).

Thereafter, the image analyzer module 14 can determine whether the termination criterion has been satisfied (step 107). If the image analyzer module 14 makes a negative determination in step 107, it can process the second and third views $\Psi_1$ and $\Psi_2$ to warp them toward the first view $\Psi_0$ as described above in connection with equations (27) through (31) (step 108), and return to step 101 for another iteration to update the dense depth map.

The image analyzer module 14 will perform steps 101 through 108 through a series of iterations, updating the dense depth map in each successive iteration. At some point, the image analyzer module 14 will determine in step 107 that the termination criterion has been satisfied, at which point it will sequence to step 109 to utilize the dense depth map as a reconstruction of the scene. In that connection, the image analyzer module 14 can, for example, display the reconstruction on a video display terminal and/or perform one or more of a number of operations which will be apparent to those skilled in the art.

It will be appreciated that numerous modifications may be made to the system 10 described above in connection with FIGS. 1 and 2. For example, the system 10 has been described as processing the views point by point, illustratively pixel by pixel. In one modification, the system 10 can process the views using a Gaussian pyramid for coarse to fine processing. In that operation, the image analyzer module 14 will initially define a series of pyramid levels from a coarse level, in which each "point" described above corresponds to a plurality of pixels, to a fine level, in which each "point" corresponds to a fewer number of pixels, for example, one pixel, with "points" in levels from the coarse level to the fine level corresponding to fewer numbers of pixels. Thereafter, the image analyzer module 14 will iteratively process each of the levels as described above in connection with FIGS. 1 and 2 to generate a depth information which can be used to establish (in the case of the first iteration) and update (in the case of the subsequent iterations) the dense depth map for the objects in the scene. By processing the views in this manner, the image analyzer module 14 can generate depth information for regions of the views for which, at the finest levels in the views, the motion of the image recorders 11 as between views, such as between views $\Psi_0$ and $\Psi_1$, was on the order of a relatively large number of pixels. In addition, this can assist in providing depth information for regions in the first view $\Psi_0$ for which, in the finer levels of the pyramid, gradients in the image intensity values are low or zero.

Furthermore, while the system 10 has been described as making use of three image recorders 11A, 11B and 11C which record respective views $\Psi_0$, $\Psi_1$ and $\Psi_2$ at respective positions relative to the scene 12, it will be appreciated that the system 10 may make use of a lesser number of image recorders, such as one or two, which record the three views $\Psi_0$, $\Psi_1$ and $\Psi_2$ at the respective positions indicated for image recorders 11A, 11B and 11C.

In addition, in the system 10 described above, it is assumed that the motion parameters t', t", $\omega$' and $\omega$" for the image recorders 11 are unknown. This may not the case if, for example, two image recorders are fixed on a common support to form a stereo rig that moves relative to the scene 12. In that case, the values of the translation and relative-angular-orientation parameters as between those image recorders will be known based on the separation (the translation parameter) and angular orientation of the image recorders relative to each other. In that case, if, for example, the values of the motion parameters t" and $\omega$" are known (that is, assuming that the stereo rig includes image recorders 11A and 11C), and assuming that image recorders 11A and 11B as shown in FIG. 1, correspond to positions of the image recorder 11A as mounted on the stereo rig and moved between the positions as shown in FIG. 1, then one view can be pre-processed to "warp" the view towards the other view, as described above in connection with equations (27)–(31) so that the new relative-angular-orientation associated with the warped image is zero. The, equation (12) corresponds to $$(I''_r + \omega''^T V) S^T t' - (S^T t'') V^T \omega' = I'_r S^T t'' \qquad (32),$$

which is linear in the translation and relative-angular-orientation parameters t' and $\omega$', respectively. Accordingly, the image processor module 14 can generate the values for the parameters t' and $\omega$ using a system of linear equations, without requiring the operations described above in connection with equations (21) through (25), and thereafter use the values for parameters t', t", and $\omega$" to generate the dense depth map as described above (in connection with, for example, equation (26)). If the image recorders are mounted on the stereo rig with a fixed relative-angular-orientation of zero, then equation (32) simplifies further to $$I''_r S^T t' - (S^T t'') V^T \omega' = I'_r S^T t'' \qquad (33),$$

which is also linear in the motion parameters t' and $\omega$'. After the values for the motion parameters have been determined in connection with equation (32) or (33), the dense depth map can be generated as described above.

In addition, although the image analyzer module 14 has been described as processing equation (12) using a particular methodology, it will be appreciated that a number of other methodologies can be used, such as, for example, non-linear optimization methodologies, particularly if it (that is, the image analyzer module 14) has some prior knowledge of rough estimates of the values of the translation and relative-angular-orientation parameters.

The invention provides a number of advantages. First, as noted above, it provides a mechanism for generating a three-dimensional reconstruction of a scene from three views $\Psi_0$, $\Psi_1$, and $\Psi_2$ recorded from three positions, without requiring the location of corresponding points in the three images. The invention provides for the generation of the reconstruction using only gradients of the image intensity values at respective points in one of the views $\Psi_0$, and differences between image intensity values as between points with corresponding coordinates in the view $\Psi_0$ and the other views $\Psi_1$ and $\Psi_2$.

As further noted above, the invention also generates information as to the image recorders which generate the respective views, in particular the relative translation and angular orientation as between the location at which view $\Psi_0$ is recorded, and the locations at which views $\Psi_1$ and $\Psi_2$ are recorded.

It will be appreciated that the image analyzer module 14 in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A scene reconstruction system for generating a reconstruction of at least one feature of at least one three-dimensional object in a scene from three two-dimensional views as recorded from a plurality of diverse locations, said scene reconstruction system comprising:

A. a motion parameter generator configured to generate in response to gradients in image intensity values at respective points in a first view and temporal derivatives of image intensity values as between second and third views and said first view values for motion parameters representing as between a first view recordation location for said first view, and view recordation locations for said second and third views;

B. a dense depth map generator configured to generate a dense depth map in response to the values for the motion parameters, gradients in image intensity values at respective points in a first view and temporal derivatives of image intensity values as between second and third views and said first view, the dense depth map representing for each point in the first view the depth of a corresponding point in the scene; and C. a scene reconstructor configured to use the dense depth map in generating a reconstruction of said at least one feature.

2. A scene reconstruction system as defined in claim 1 in which the reconstruction is a two-dimensional reconstruction comprising an image.

3. A scene reconstruction system as defined in claim 1 in which the reconstruction is a three-dimensional reconstruction.

4. A scene reconstruction system as defined in claim 1 in which said motion parameter generator generates the motion parameters in accordance with $$I''_t S^T t' - I'_t S^T t'' + S^T[t'\omega''^T - t''\omega'^T]V = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and $I'_t$ and $I''_t$ represent the temporal derivatives represent the temporal derivatives between the first view and the second and third views respectively.

5. A scene reconstruction system as defined in claim 1 in which the dense depth map generator generates the dense depth map for at least one point in the first view, defined by coordinates (x,y), in accordance with $$1/z S^T t' + V^T \omega' + I'_t = 0$$

and $$\frac{1}{z} S^T t'' + V^T \omega'' + I''_t = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and $I'_t$ and $I''_t$ represent the temporal derivatives between the first view and the second and third views respectively.

6. A scene reconstruction system as defined in claim 1 in which the dense depth map generator generates the dense depth map to have a depth value "Z" associated with a point (x,y) in at least a region R in the first view in accordance with $$\mathrm{minarg} \frac{1}{z} \sum_{x,y \in R} \sum_j \beta(x,y)|S^T t^j|^p \left( \frac{1}{z} S^T t^j + V^T \omega^j + I_t^j \right)^2$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and I'$_t$ and I"$_t$ represent the temporal derivatives between the first view and the second and third views respectively, "min" is a "minimum" function, "β(x,y)" is a selected windowing function for a region "R" around the point (x,y) in the first view for which the depth value "z" is being generated, "j" identifies the respective second or third view, and "p" is a selected exponent value.

7. A method of generating a reconstruction of at least one feature of at least one three-dimensional object in a scene from three two-dimensional views as recorded from a plurality of diverse locations, said scene reconstruction method comprising the steps of:

A. generating in response to gradients in image intensity values at respective points in a first view and temporal derivatives of image intensity values as between second and third views and said first view values for motion parameters representing as between a first view recordation location for said first view, and view recordation locations for said second and third views;

B. generating a dense depth map in response to the values for the motion parameters, gradients in image intensity values at respective points in a first view and temporal derivatives of image intensity values as between second and third views and said first view, the dense depth map representing for each point in the first view the depth of a corresponding point in the scene; and C. using the dense depth map in generating a reconstruction of said at least one feature.

8. A scene reconstruction method as defined in claim 7 in which the reconstruction is a two-dimensional reconstruction comprising an image.

9. A scene reconstruction method as defined in claim 7 in which the reconstruction is a three-dimensional reconstruction.

10. A scene reconstruction method as defined in claim 7 in which said motion parameter generation step includes the step of generating the motion parameters in accordance with $$I''_t S^T t' - I'_t S^T t'' + S^T [t'\omega''^T - t''\omega'^T] V = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, ω' and ω" are relative-angular-orientation parameters representing relative angular orientation between the first view and the second and third views, respectively, x and y represent coordinates of respective points in the first view, I$_x$ and I$_y$ represent components of the gradient at the respective point with coordinates (x,y) and I'$_t$ and I"$_t$ represent the temporal derivatives represent the temporal derivatives between the first view and the second and third views respectively.

11. A scene reconstruction method as defined in claim 7 in which the dense depth map generating step includes the step of generating the dense depth map for at least one point in the first view, defined by coordinates (x,y), in accordance with $$\frac{1}{z} S^T t' + V^T \omega' + I'_t = 0$$

and $$\frac{1}{z} S^T t'' + V^T \omega'' + I''_t = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, ω' and ω" are relative-angular-orientation parameters representing relative angular orientation between the first view and the second and third views, respectively, x and y represent coordinates of respective points in the first view, I$_x$ and I$_y$ represent components of the gradient at the respective point with coordinates (x,y) and I'$_t$ and I"$_t$ represent the temporal derivatives between the first view and the second and third views respectively.

12. A scene reconstruction method as defined in claim 7 in which the dense depth map generating step includes the step of generating the dense depth map to have a depth value "Z" associated with a point (x,y) in at least a region R in the first view in accordance with $$\operatorname{minarg}_{\frac{1}{z}} \sum_{x,y \in R} \sum_j \beta(x,y) |S^T t^j|^p \left( \frac{1}{z} S^T t^j + V^T \omega^j + I_t^j \right)^2$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, ω' and ω" are relative-angular-orientation parameters representing relative angular orientation between the first view and the second and third views, respectively, x and y represent coordinates of respective points in the first view, I$_x$ and I$_y$ represent components of the gradient at the respective point with coordinates (x,y) and I'$_t$ and I"$_t$ represent the temporal derivatives between the first view and the second and third views respectively, "min" is a "minimum" function, "β(x,y)" is a selected windowing function for a region "R" around the point (x,y) in the first view for which the depth value "z" is being generated, "j" identifies the respective second or third view, and "p" is a selected exponent value.

13. A scene reconstruction computer program product for use in enabling a computer to generate a reconstruction of at least one feature of at least one three-dimensional object in a scene from three two-dimensional views as recorded from a plurality of diverse locations, said scene reconstruction computer program product comprising a computer-readable medium having encoded thereon:
  A. a motion parameter generator module configured to enable the computer to generate in response to gradients in image intensity values at respective points in a first view and temporal derivatives of image intensity values as between second and third views and said first view values for motion parameters representing as between a first view recordation location for said first view, and view recordation locations for said second and third views;
  B. a dense depth map generator module configured to enable the computer to generate a dense depth map in response to the values for the motion parameters, gradients in image intensity values at respective points in a first view and temporal derivatives of image intensity values as between second and third views and said first view, the dense depth map representing for each point in the first view the depth of a corresponding point in the scene; and
  C. a scene reconstructor module configured to enable the computer to use the dense depth map in generating a reconstruction of said at least one feature.

14. A scene reconstruction computer program product as defined in claim 13 in which the reconstruction is a two-dimensional reconstruction comprising an image.

15. A scene reconstruction computer program product as defined in claim 13 in which the reconstruction is a three-dimensional reconstruction.

16. A scene reconstruction system as defined in claim 13 in which said motion parameter generator module enables the computer to generate the motion parameters in accordance with $$I''_t S^T t' - I'_t S^T t'' + S^T [t' \omega''^T - t'' \omega'^T] V = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and $I'_t$ and $I''_t$ represent the temporal derivatives represent the temporal derivatives between the first view and the second and third views respectively.

17. A scene reconstruction computer program product as defined in claim 13 in which the dense depth map generator module enables the computer to generate the dense depth map for at least one point in the first view, defined by coordinates (x,y), in accordance with $$\frac{1}{z} S^T t' + V^T \omega' + I'_t = 0$$

and $$\frac{1}{z} S^T t'' + V^T \omega'' + I''_t = 0$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and $I'_t$ and $I''_t$ represent the temporal derivatives between the first view and the second and third views respectively.

18. A scene reconstruction computer program product as defined in claim 13 in which the dense depth map generator module enables the computer to generate the dense depth map to have a depth value "Z" associated with a point (x,y) in at least a region R in the first view in accordance with $$\min\arg\frac{1}{z} \sum_{x,y \in R} \sum_{j} \beta(x,y) |S^T t^j|^p \left( \frac{1}{z} S^T t^j + V^T \omega^j + I_t^j \right)^2$$

where $$S = \begin{pmatrix} I_x \\ I_y \\ -xI_x - yI_y \end{pmatrix}$$

and $$V = \begin{pmatrix} -I_y - y(xI_x + yI_y) \\ I_x + x(xI_x + yI_y) \\ xI_y - yI_x \end{pmatrix}$$

and t' and t" are translation parameters representing translational motion between the first view and the second and third views, respectively, $\omega'$ and $\omega''$ are relative-angular-orientation parameters representing relative angular orientation between the first view and the second and third views, respectively, x and y represent coordinates of respective points in the first view, $I_x$ and $I_y$ represent components of the gradient at the respective point with coordinates (x,y) and $I'_t$ and $I''_t$ represent the temporal derivatives between the first view and the second and third views respectively, "min" is a "minimum" function, "$\beta(x,y)$" is a selected windowing function for a region "R" around the point (x,y) in the first view for which the depth value "z" is being generated, "j" identifies the respective second or third view, and "p" is a selected exponent value.

* * * * *